US012323836B2

(12) United States Patent
Cui et al.

(10) Patent No.: US 12,323,836 B2
(45) Date of Patent: Jun. 3, 2025

(54) METHODS AND APPARATUS OF HANDLING INTERRUPTION FOR MULTIPLE SCELL ACTIVATION

(71) Applicant: APPLE INC., Cupertino, CA (US)

(72) Inventors: Jie Cui, Cupertino, CA (US); Hong He, Cupertino, CA (US); Dawei Zhang, Cupertino, CA (US); Chunhai Yao, Beijing (CN); Chunxuan Ye, San Diego, CA (US); Haitong Sun, Cupertino, CA (US); Weidong Yang, San Diego, CA (US); Wei Zeng, Cupertino, CA (US); Yuchul Kim, Cupertino, CA (US); Yushu Zhang, Beijing (CN); Zhibin Wu, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 380 days.

(21) Appl. No.: 17/757,307

(22) PCT Filed: Dec. 15, 2020

(86) PCT No.: PCT/CN2020/136517
§ 371 (c)(1),
(2) Date: Jun. 14, 2022

(87) PCT Pub. No.: WO2021/159848
PCT Pub. Date: Aug. 19, 2021

(65) Prior Publication Data
US 2022/0361029 A1    Nov. 10, 2022

(30) Foreign Application Priority Data
Feb. 12, 2020   (WO) ................ PCT/CN2020/074853

(51) Int. Cl.
*H04W 24/10*     (2009.01)
*H04B 17/318*    (2015.01)
*H04L 5/00*      (2006.01)

(52) U.S. Cl.
CPC .......... *H04W 24/10* (2013.01); *H04B 17/318* (2015.01); *H04L 5/0048* (2013.01)

(58) Field of Classification Search
CPC .... H04W 24/10; H04B 17/318; H04L 5/0048; H04L 1/0026; H04L 1/0027;
(Continued)

(56) References Cited

U.S. PATENT DOCUMENTS

2013/0208711 A1   8/2013  Van Lieshout et al.
2016/0270064 A1   9/2016  Dinan
(Continued)

FOREIGN PATENT DOCUMENTS

CN     105790919 A    7/2016
CN     110050479 A    7/2019
(Continued)

OTHER PUBLICATIONS

Machine translated English version of KR 20190065378 A retrieved from PE2E on Dec. 13, 2024 (Year: 2019).*
(Continued)

*Primary Examiner* — Joseph E Avellino
*Assistant Examiner* — Adam Joel Cerlanek
(74) *Attorney, Agent, or Firm* — Dorsey & Whitney LLP

(57) ABSTRACT

Systems and methods are provided for determining which part or operation of one or more Secondary Cell (SCell) activation process (es) to defer or restart when an attempt to simultaneously perform multiple operations of the one or more SCell activation processes would cause interference. For example, radio frequency (RF) tuning and/or automatic gain control (AGC) settling for an SCell activation may be
(Continued)

deferred until after a Hybrid Automatic Repeat Request (HARQ) for the SCell activation is sent by a UE to the SCell. In another example, RF tuning and/or AGC settling corresponding to the activation of a first SCell may be deferred until after RF tuning and/or AGC settling corresponding to the activation of a second SCell is complete.

3 Claims, 16 Drawing Sheets

(58) Field of Classification Search
 CPC ... H04L 1/1854; H04L 5/0026; H04L 5/0032; H04L 5/0053; H04L 5/0098; H04L 27/08; H04L 5/001
 See application file for complete search history.

(56) References Cited

U.S. PATENT DOCUMENTS

| | | | |
|---|---|---|---|
| 2016/0270071 A1* | 9/2016 | Dinan | ................... H04L 1/1854 |
| 2019/0029004 A1 | 1/2019 | Zhang et al. | |
| 2019/0254051 A1 | 8/2019 | Li et al. | |
| 2022/0038334 A1* | 2/2022 | Siomina | ................ H04L 5/0078 |
| 2022/0217800 A1* | 7/2022 | Zhang | ................... H04L 5/0048 |

FOREIGN PATENT DOCUMENTS

| | | | | |
|---|---|---|---|---|
| CN | 110121162 A | | 8/2019 | |
| EP | 3568946 A1 | | 11/2019 | |
| KR | 20190065378 A | * | 6/2019 | .......... H04W 7/0833 |
| WO | 2012096485 A2 | | 7/2012 | |

OTHER PUBLICATIONS

Machine translated English version of KR 20190065378 A retrieved from PE2E on Mar. 10, 2025 (Year: 2019).*
PCT/CN2020/136517, International Search Report and Written Opinion, Mar. 17, 2021, 9 pages.
ZTE, "Discussion on RRM requirements for multiple SCell activation and deactivation", R4-1911567, 3GPP TSG-RAN WG4 Meeting #92bis, Chongqing, China, Agenda Item 8.15.1.2, Oct. 14-18, 2019, 4 pages.
Apple, "On activation delay extension due to multiple SCell activations", R4-1913500, 3GPP TSG-RAN4 Meeting #93, Reno, Nevada, USA, Agenda Item 9.15.1.2, Nov. 18-22, 2019, 5 pages.

* cited by examiner

METHODS AND APPARATUS OF HANDLING INTERRUPTION FOR MULTIPLE SCELL ACTIVATION

TECHNICAL FIELD

This application relates generally to wireless communication systems, and more specifically to handling interruption for multiple secondary cell (SCell) activation.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX®); and the IEEE 802.11 standard for wireless local area networks (WLAN), which is commonly known to industry groups as Wi-Fi®. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Interruption of Multiple SCell Activation

A principle to define the activation requirements for multiple secondary cells (SCells) is discussed. While activating an SCell, if any other SCell is activated or deactivated, a user equipment (UE) is may do activation on multiple SCells in parallel, provided that the Synchronization Signal Block (SSB) Subcarrier Spacing (SCS) of the SCells being activated on the same band is the same or that the SSB SCS of the SCells being activated on the same band is different and the combination of the SCSs of data and SSB for all Component Carriers (CCs) in the same band is supported by the UE. An exception may be during MAC-CE processing and search.

While activating an unknown SCell, if any other unknown SCell is activated, the activation delay of the concerned SCell may further consider the number of parallel cell detection performed by UE on multiple Secondary Component Carriers (SCCs). The number of searchers is assumed as 2 in Radio Resource Management (RRM requirements). The activation delay may be increased if the interruption due to activating/deactivating on another SCell causes the UE to miss receiving an SSB on an SCell currently being activated.

Further, there is a question of Hybrid Automatic Repeat Request (HARQ) feedback priority, regarding whether, in the activation procedure of a target deactivated SCell, a HARQ feedback signal's priority on other CCs may be higher or lower than the target deactivated SCell RF tuning/AGC settling.

In brief, there are at least two issues that need to be solved for UE behavior or implementation: 1) which UE behavior may be prioritized for implementation: RF tuning/AGC settling or HARQ feedback? And 2) in case interruption (e.g., due to RF tuning/AGC settling) occurs, what may be the UE implementation on the procedure of an on-going SCell activation?

Further, the process or procedure of SCell activation may comprise multiple parts or operations. It may be beneficial for the UE to determine which part or operation of an SCell activation is interrupted (e.g., due to RF tuning/AGC settling). It may also be beneficial for the UE to determine which SCell (the current SCell or another SCell) is doing the interrupting of said part or operation in order to react accordingly.

Prioritization of RF Tuning/AGC Settling

Figure 1:
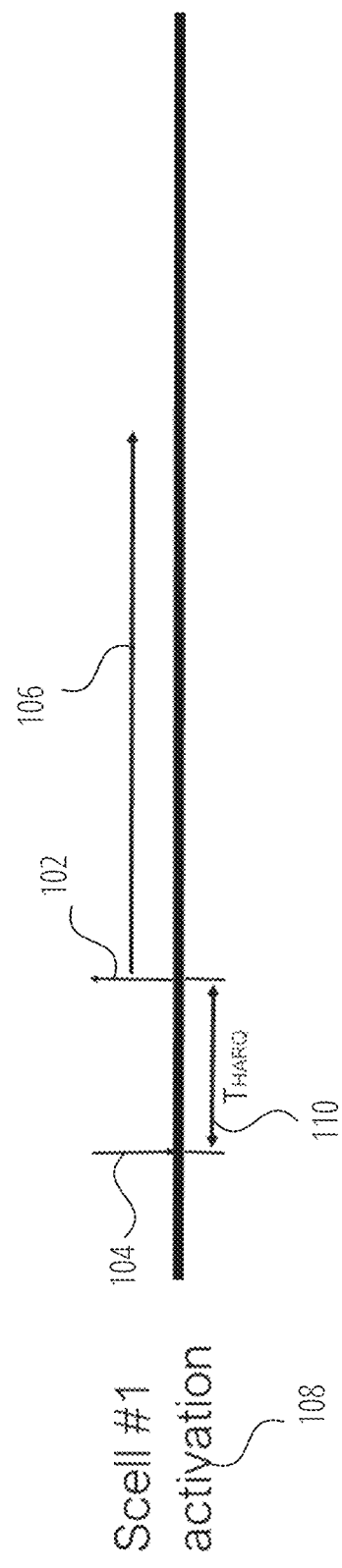
FIG. 1 illustrates prioritization of Radio Frequency (RF) tuning/Automatic Gain Control (AGC) settling according to an embodiment.

FIG. 1 illustrates prioritization of RF tuning/AGC settling according to an embodiment. The priority of HARQ feedback 102 for the activation command 104 (e.g., a MAC CE) may be higher than deactivated SCell RF tuning/AGC settling 106 if the HARQ feedback is for the same SCell activation 108. The HARQ feedback 102 may follow the activation command 104 by at least a HARQ period 110, regardless of any shorter amount of time the UE takes to prepare the HARQ feedback 102 after receiving the activation command 104.

Figure 2:
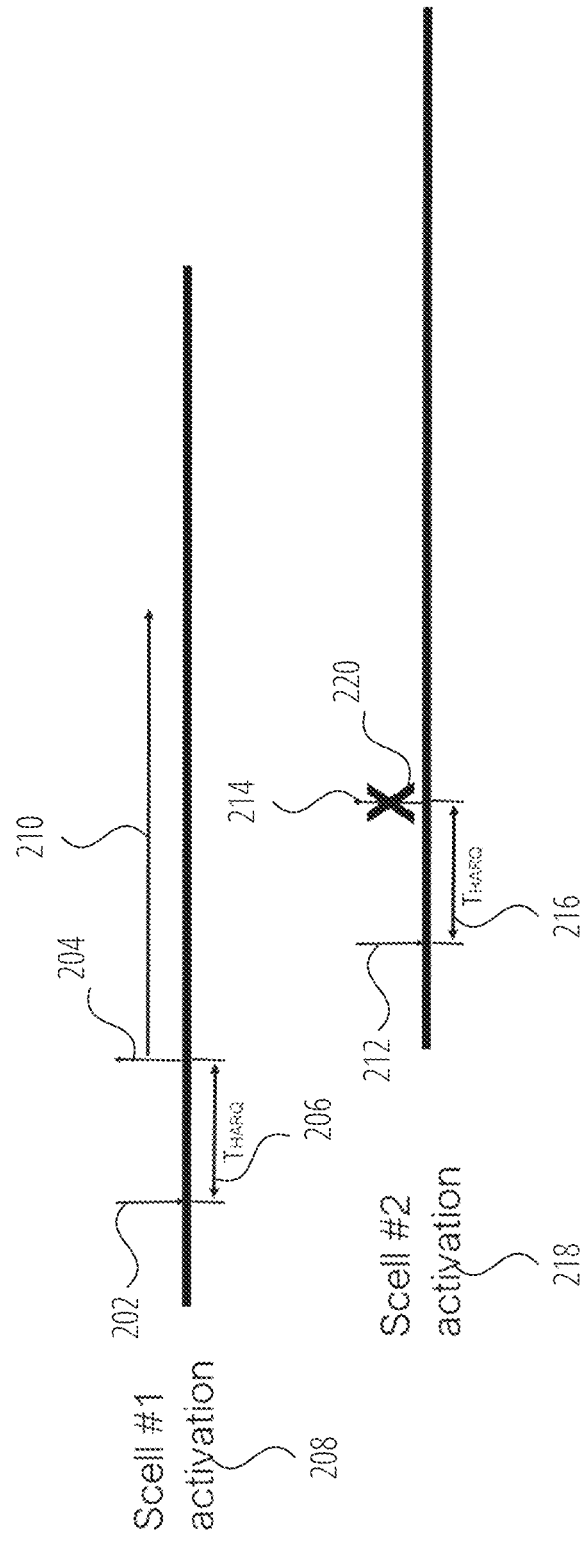
FIG. 2 illustrates prioritization of RF tuning/AGC settling according to an embodiment.

FIG. 2 illustrates prioritization of RF tuning/AGC settling according to an embodiment. The priority of deactivated SCell RF tuning/AGC settling on one certain Secondary Component Carrier (SCC) during SCC activation procedure may be higher than any HARQ feedback on other SCC or Primary Component Carrier (PCC). For example, the first activation command 202 (e.g., a MAC CE) of first SCell activation 208 may occur on slot #n. The first HARQ feedback 204 for the first activation command 202 may be sent by the UE after the first HARQ period 206. The first SCell activation 208 may then proceed to the first RF tuning/AGC settling 210.

The first RF tuning/AGC settling 210 may not be scheduled to perform before the first HARQ period 206+1 slot. In some embodiments, the first HARQ period 206 is configured by the network for HARQ preparation time. It may be that UE may have faster preparation than this configuration in these cases, the UE may still wait until the first HARQ period 206 has passed to send the first HARQ feedback 204 and proceed to the first RF tuning/AGC settling 210.

The second activation command 212 (e.g., a MAC CE) of the second SCell activation 218 may occur on slot #n+m (e.g., a slot that comes later than the slot #n upon which the first activation command 202 arrived). The UE may determine that the second HARQ feedback 214 should be sent by the UE after the second HARQ period 216. However, the second HARQ feedback 214 for second activation command 212 may not have higher priority than first RF tuning/AGC settling 210 of the first SCell activation 208, so it may be interrupted 220 by the first RF tuning/AGC settling 210.

SCell Activation with Interruption from Other SCCs

Figure 3:
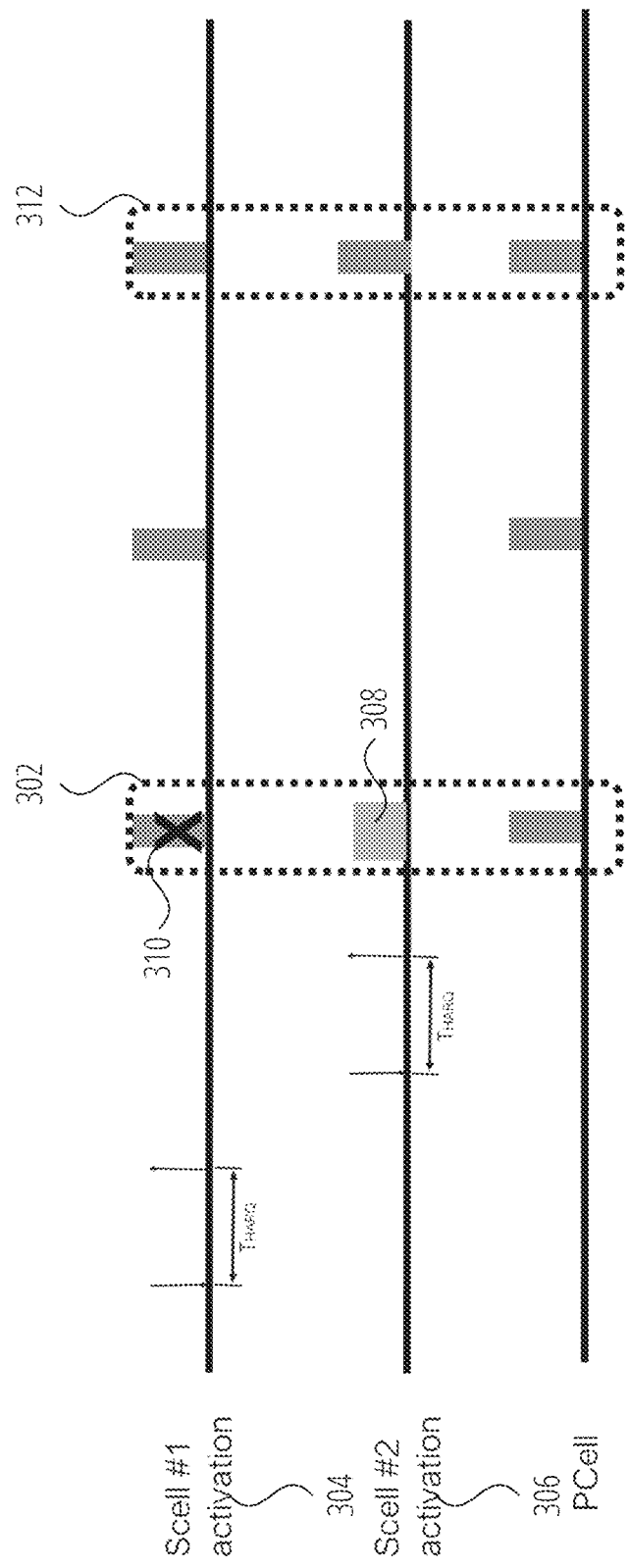
FIG. 3 illustrates Secondary Cell (SCell) activation with interruption from other Secondary Component Carriers (SCCs), according to an embodiment.

FIG. 3 illustrates SCell activation with interruption from other SCCs, according to an embodiment. In some embodiments, an interruption (e.g., due to RF tuning and/or AGC settling) from other SCC activations may interrupt or influence the reference signal (RS) for AGC settling of the target to-be-activated SCell. In these cases, the UE may drop the interrupted and/or influenced RS and wait for the next available RS when all the RSs of active serving cells and the SCell being activated are aligned on time domain in the same band. From an activation delay perspective, extra SSB-based Measurement Timing (SMTC) maximum periodicity ($T_{SMTC\_MAX}$) may be used at the UE side to decide the next available RS for AGC settling, where $T_{SMTC\_MAX}$ is the longest SSB-based Measurement Timing (SMTC) periodicity between active serving cells and SCells being activated in the same band.

An example is provided in relation to FIG. 3. During a first SSB occasion 302 the first SCell activation 304 may attempt to perform AGC settling at the same time that the second SCell activation 306 is undergoing, for example, RF tuning 308. The first SSB occasion 302 therefore may not be used for AGC settling for the first SCell activation 304, and may be dropped due to interruption 310. AGC settling for the first SCell activation 304 may instead be performed at the second SSB occasion 312, which may be the next available (or an available) SSB occasion for AGC settling. This may be in part because the second SSB occasion 312 has all the RSs of active serving cells and the SCell being activated aligned on time domain in the same band, as illustrated.

In some embodiments, an interruption (e.g., due to RF tuning or AGC settling) from other SCC activations may interrupt and/or influence the RS for timing and/or frequency tracking of the target to-be-activated SCell. In these cases, the UE may drop the interrupted and/or influenced RS and wait for the next available SSB. From an activation delay perspective, extra SMTC periodicity of the target SCells being activated ($T_{SMTC}$) may be used at UE side to decide the next available RS for timing and/or frequency tracking.

In some embodiments, an interruption (e.g., due to RF tuning or AGC settling) from other SCC activations may interrupt and/or influence the RS for a L1-Reference Signal Received Power (L1-RSRP) measurement occasion of the target to-be-activated SCell. In these cases, the UE may drop the interrupted and/or influenced RS and wait for the next available L1-RSRP measurement RS. In some embodiments, from an activation delay perspective, extra SSB periodicity for L1-RSRP measurement of the target SCells being activated ($T_{SSB}$) may be used at UE side to decide the next available RS for L1-RSRP measurement. Alternatively, from an activation delay perspective, extra Channel State Information Reference Signal (CSI-RS) periodicity for L1-RSRP measurement of the target SCells being activated ($T_{CSI-RS}$) may be used at UE side to decide the next available RS for L1-RSRP measurement)

In some embodiments, an interruption (e.g., due to RF tuning or AGC settling) from other SCC activations may interrupt and/or influence the L1-RSRP/CSI reporting resource of the target to-be-activated SCell. In these cases, UE may drop the interrupted and/or influenced L1-RSRP/CSI reporting resource and wait for the next available L1-RSRP/CSI reporting resource.

In some embodiments, an interruption (e.g., due to RF tuning or AGC settling) from other SCC activations may interrupt and/or influence the CQI measurement and/or reporting occasion of the target to-be-activated SCell. In these instances, the UE's response may change based on whether the Carrier Aggregation (CA) case is an intra-band case or an inter-band case.

In an intra-band CA case (e.g., where the interruption is from another SCell activation which is in same band as target to-be-activated SCell), a UE may restart the CQI measurement on the target to-be-activated SCell with an updated AGC, and then perform the CQI reporting. In the intra-band CA case, this may be used when it is either of the CQI measurement occasion or the CQI reporting occasion that is interrupted and/or influenced.

In an inter-band CA case (e.g., where the interruption is from another SCell activation which is in different band from target to-be-activated SCell), the UE's response may further differ based on whether it is the CQI measurement occasion or the CQI reporting occasion that is interrupted and/or influenced.

If the CQI measurement occasion is influenced and/or interrupted, UE may drop the influenced and/or interrupted CQI measurement occasion and then continue the CQI measurement on the next available CQI measurement occasion for the target to-be-activated SCell.

If the CQI reporting resource is influenced and/or interrupted, UE may drop the influenced and/or interrupted CQI reporting resource and then continue the CQI reporting on the next available CQI reporting resource for the target to-be-activated SCell.

Figure 4:
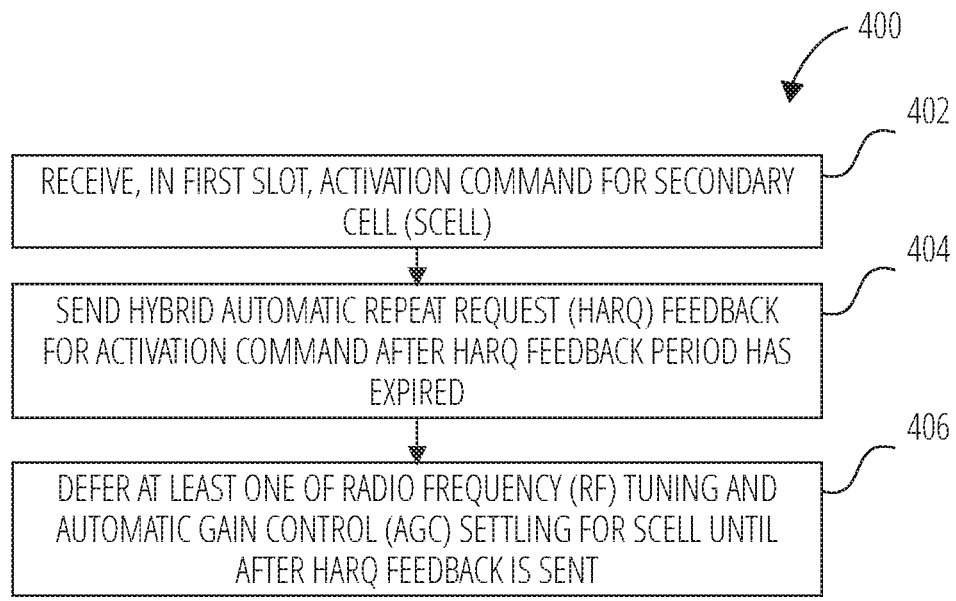
FIG. 4 illustrates a method for prioritization of RF tuning/AGC settling according to an embodiment.

FIG. 4 illustrates a method 400 for prioritization of RF tuning/AGC settling according to an embodiment. In block 402, method 400 receives, in a first slot, an activation command for a secondary cell (SCell). In block 404, method 400 sends a Hybrid Automatic Repeat Request (HARQ) feedback for the activation command after a HARQ feedback period has expired. In block 406, method 400 defers at least one of Radio Frequency (RF) tuning and Automatic Gain Control (AGC) settling for the SCell until after the HARQ feedback is sent.

Figure 5:
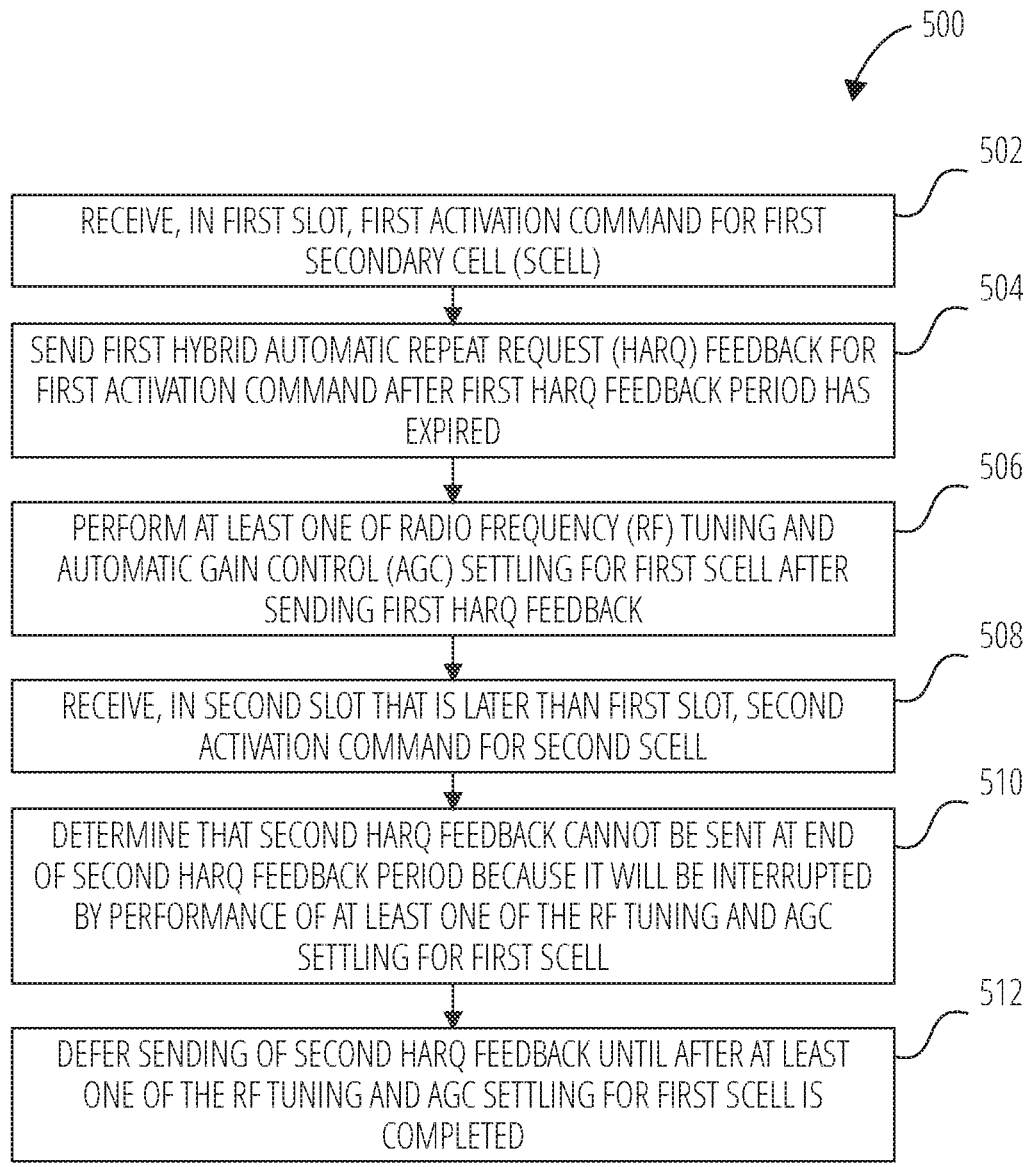
FIG. 5 illustrates a method for prioritization of RF tuning/AGC settling according to an embodiment.

FIG. 5 illustrates a method 500 illustrates a method for prioritization of RF tuning/AGC settling according to an embodiment. In block 502, method 500 receives, in a first slot, a first activation command for a first secondary cell (SCell). In block 504, method 500 sends a first Hybrid Automatic Repeat Request (HARQ) feedback for the first activation command after a first HARQ feedback period has expired. In block 506, method 500 performs at least one of Radio Frequency (RF) tuning and Automatic Gain Control (AGC) settling for the first SCell after sending the first HARQ feedback. In block 508, method 500 receives, in a second slot that is later than the first slot, a second activation command for a second SCell. In block 510, method 500 determines that a second HARQ feedback cannot be sent at an end of a second HARQ feedback period because it will be interrupted by the performance of the at least one of the RF tuning and AGC settling for the first SCell. In block 512, method 500 defers the sending of the second HARQ feedback until after the at least one of the RF tuning and AGC settling for the first SCell is completed.

Figure 6:
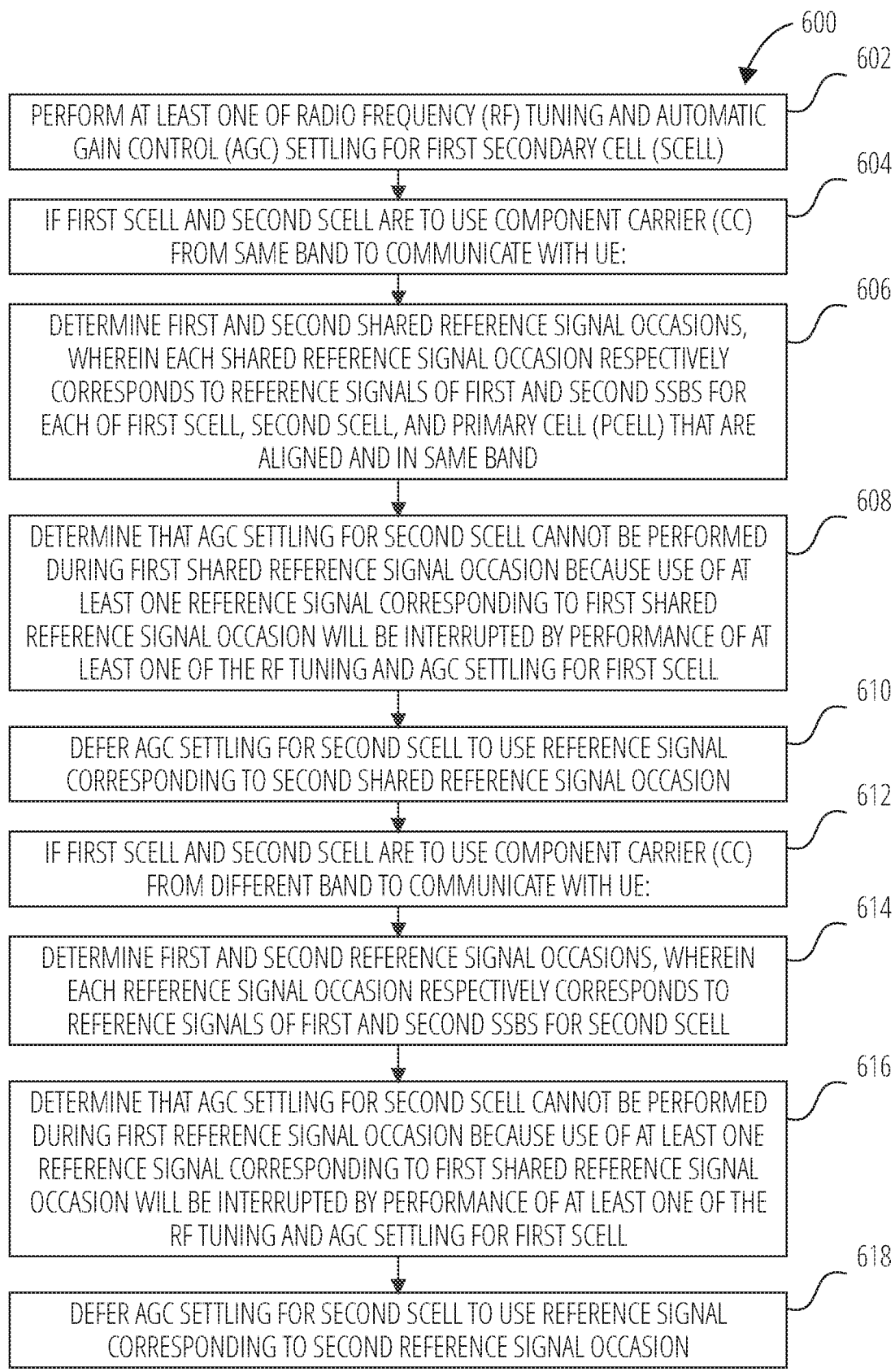
FIG. 6 illustrates a method in accordance with one embodiment.

FIG. 6 illustrates a method 600 according to one embodiment. In block 602, method 600 performs at least one of Radio Frequency (RF) tuning and Automatic Gain Control (AGC) settling for a first secondary cell (SCell). In block 604, if the first SCell and a second SCell are to use a component carrier (CC) from a same band to communicate with the UE, the method 600 determines to perform block 606, block 608, and block 610. In block 606, method 600 determines first and second shared reference signal occasions, wherein each shared reference signal occasion respectively corresponds to reference signals of first and second SSBs for each of the first SCell, the second SCell, and a Primary Cell (PCell) that are aligned and in the same band. In block 608, method 600 determines that AGC settling for the second SCell cannot be performed during the first shared reference signal occasion because a use of at least one reference signal corresponding to the first shared reference signal occasion will be interrupted by the performance of the at least one of the RF tuning and AGC settling for the first SCell. In block 610, method 600 defers the AGC settling for the second SCell to use a reference signal corresponding to the second shared reference signal occasion.

In block 612, if the first SCell and the second SCell are to use a component carrier (CC) from a different band to communicate with the UE, the method 600 determines to perform block 614, block 616, and block 618. In block 614, method 600 determines first and second reference signal occasions, wherein each reference signal occasion respectively corresponds to reference signals of first and second SSBs for the second SCell. In block 616, method 600 determines that AGC settling for the second SCell cannot be performed during the first reference signal occasion because a use of at least one reference signal corresponding to the first shared reference signal occasion will be interrupted by the performance of the at least one of the RF tuning and AGC settling for the first SCell. In block 618, method 600 defers the AGC settling for the second SCell to use the reference signal corresponding to the second reference signal occasion.

Figure 7:
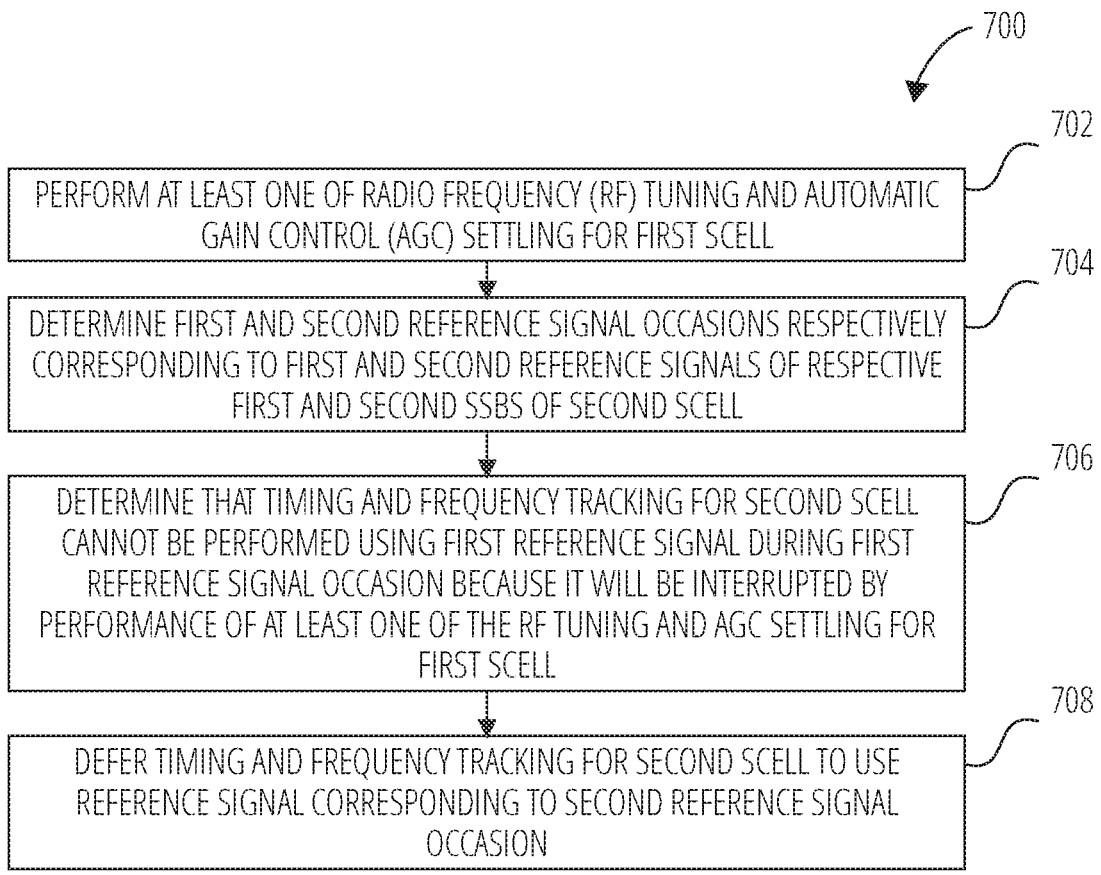
FIG. 7 illustrates a method for SCell activation with interruption from other SCCs, according to an embodiment.

FIG. 7 illustrates a method 700 for SCell activation with interruption from other SCCs, according to an embodiment. In block 702, method 700 performs at least one of Radio Frequency (RF) tuning and Automatic Gain Control (AGC) settling for a first SCell. In block 704, method 700 determines first and second reference signal occasions respectively corresponding to first and second reference signals of respective first and second SSBs of a second SCell. In block 706, method 700 determines that timing and frequency tracking for the second SCell cannot be performed using the first reference signal during the first reference signal occasion because it will be interrupted by the performance of the at least one of the RF tuning and AGC settling for the first SCell. In block 708, method 700 defers the timing and frequency tracking for the second SCell to use the reference signal corresponding to the second reference signal occasion.

Figure 8:
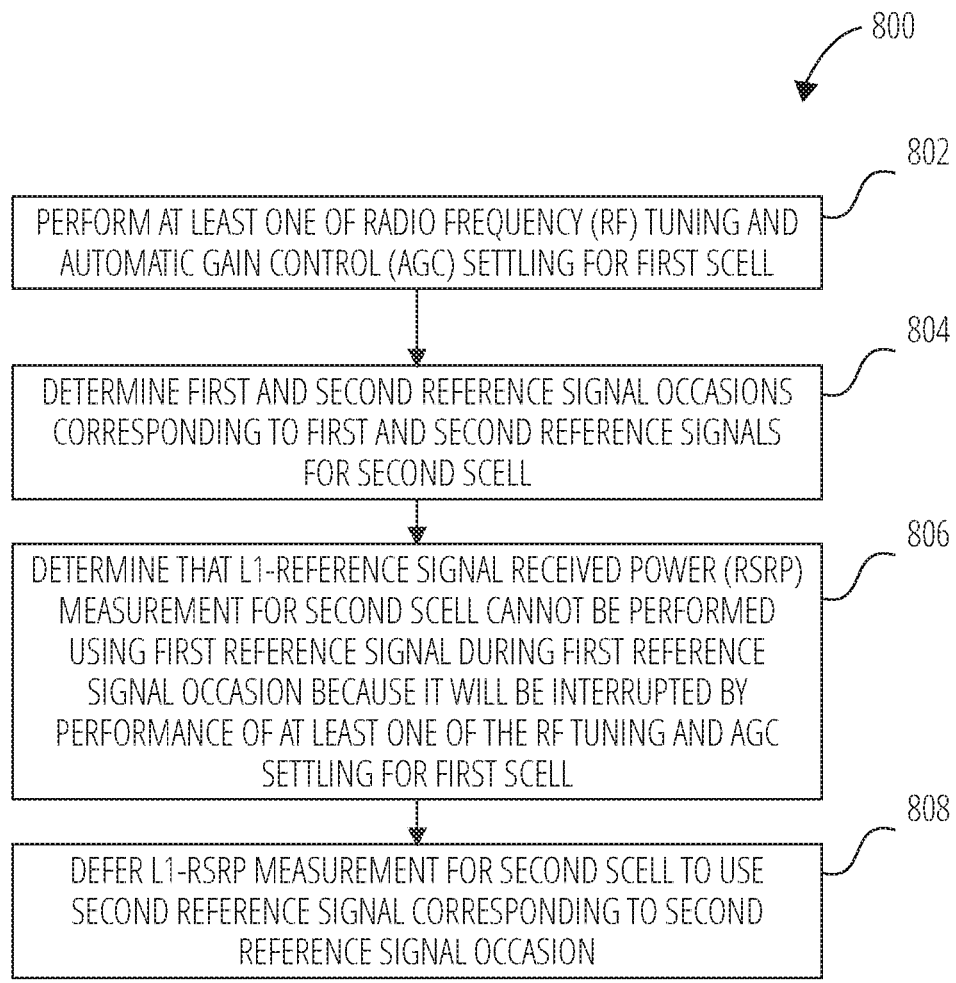
FIG. 8 illustrates a method for SCell activation with interruption from other SCCs, according to an embodiment.

FIG. 8 illustrates a method 800 for SCell activation with interruption from other SCCs, according to an embodiment. In block 802, method 800 performs at least one of Radio Frequency (RF) tuning and Automatic Gain Control (AGC) settling for a first SCell. In block 804, method 800 determines first and second reference signal occasions corresponding to first and second reference signals for a second SCell. In block 806, method 800 determines that a L1-Reference Signal Received Power (RSRP) measurement for the second SCell cannot be performed using the first reference signal during the first reference signal occasion because it will be interrupted by the performance of the at least one of the RF tuning and AGC settling for the first SCell. In block 808, method 800 defers the L1-RSRP measurement for the second SCell to use the second reference signal corresponding to the second reference signal occasion.

Figure 9:
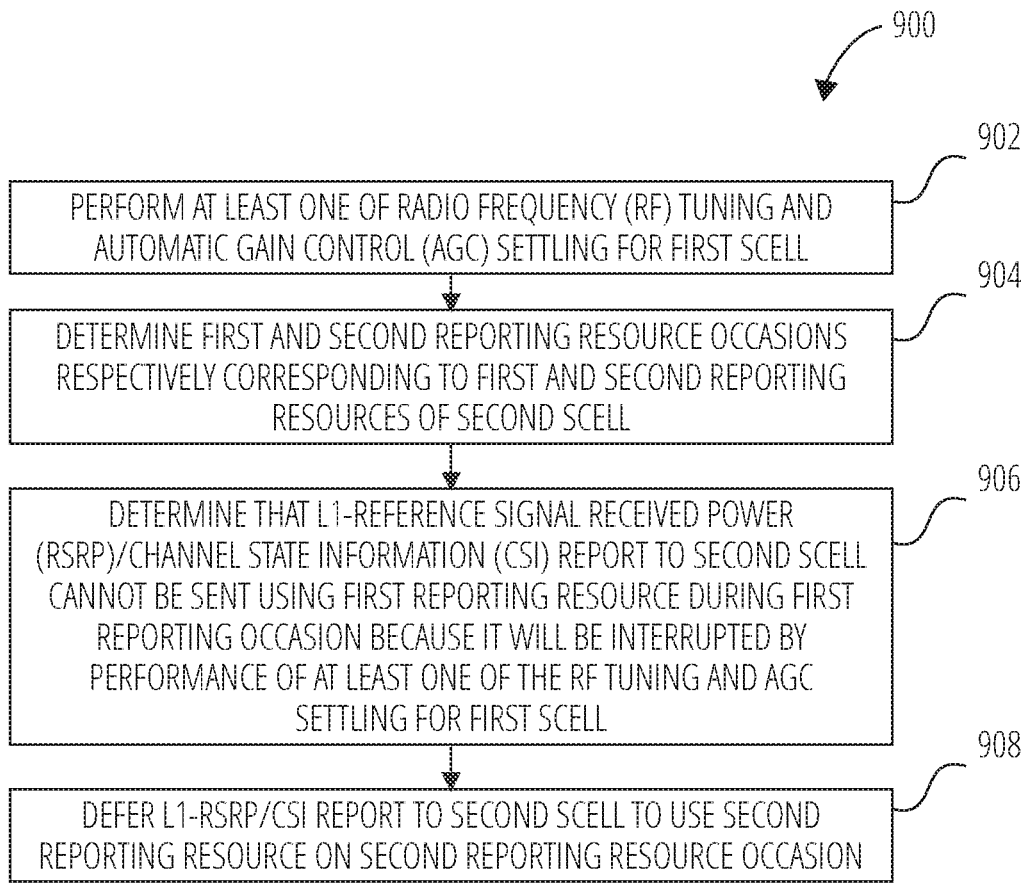
FIG. 9 illustrates a method for SCell activation with interruption from other SCCs, according to an embodiment.

FIG. 9 illustrates a method 900 for SCell activation with interruption from other SCCs, according to an embodiment. In block 902, method 900 performs at least one of Radio Frequency (RF) tuning and Automatic Gain Control (AGC) settling for a first SCell. In block 904, method 900 determines first and second reporting resource occasions respectively corresponding to first and second reporting resources of a second SCell. In block 906, method 900 determines that a L1-Reference Signal Received Power (RSRP)/Channel State Information (CSI) report to the second SCell cannot be sent using the first reporting resource during the first reporting occasion because it will be interrupted by the performance of the at least one of the RF tuning and AGC settling for the first SCell. In block 908, method 900 defers the L1-RSRP/CSI report to the second SCell to use the second reporting resource on the second reporting resource occasion.

Figure 10:
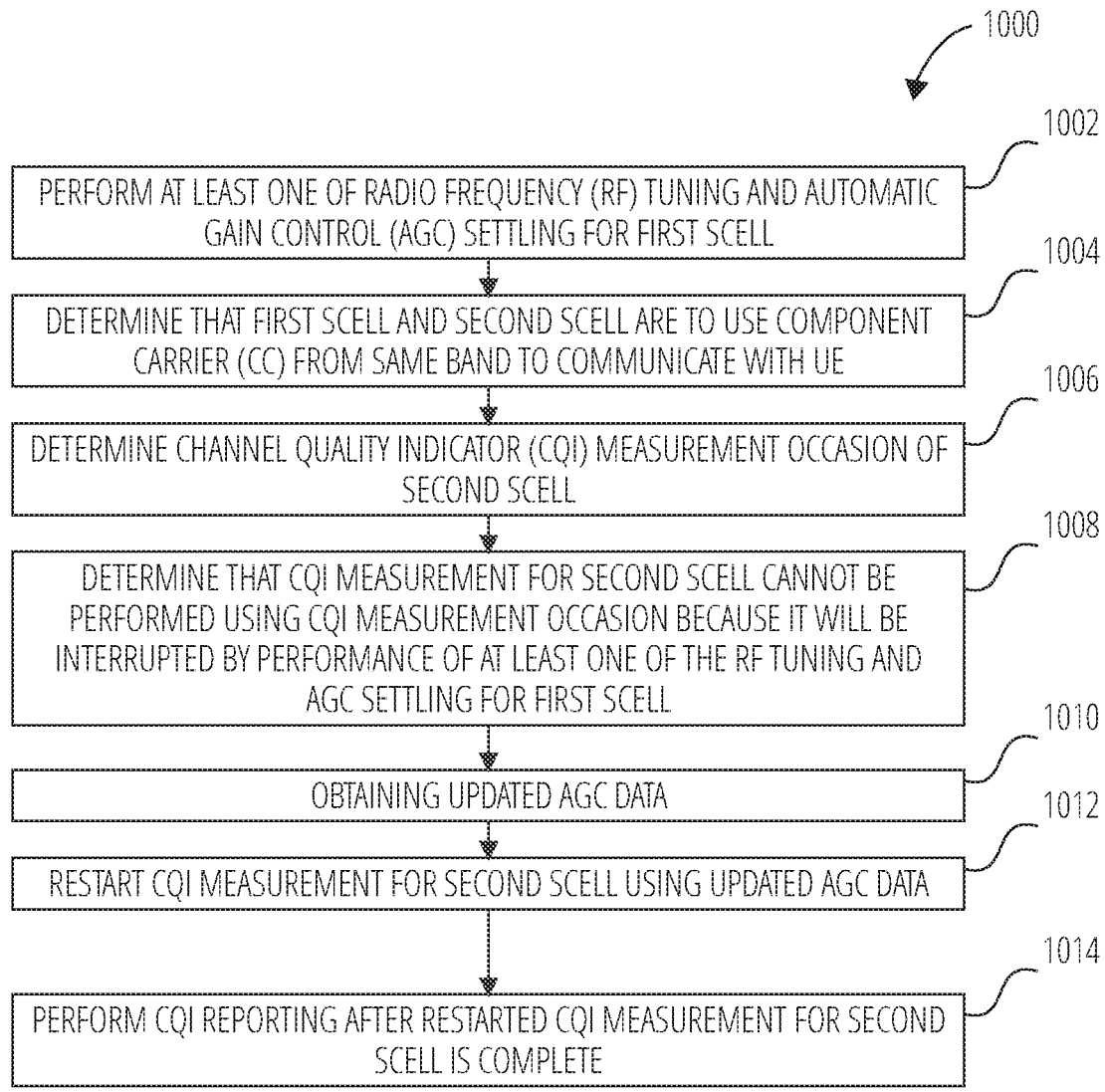
FIG. 10 illustrates a method for SCell activation with interruption from other SCCs, according to an embodiment.

FIG. 10 illustrates a method 1000 for SCell activation with interruption from other SCCs, according to an embodiment. In block 1002, method 1000 performs at least one of Radio Frequency (RF) tuning and Automatic Gain Control (AGC) settling for a first SCell. In block 1004, method 1000 determines that the first SCell and a second SCell are to use a component carrier (CC) from a same band to communicate with the UE. In block 1006, method 1000 determines a Channel Quality Indicator (CQI) measurement occasion of the second SCell. In block 1008, method 1000 determines that a CQI measurement for the second SCell cannot be performed using the CQI measurement occasion because it will be interrupted by the performance of the at least one of the RF tuning and AGC settling for the first SCell. In block 1010, method 1000 obtaining updated AGC data. In block 1012, method 1000 restarts a CQI measurement using the updated AGC data. In block 1014, method 1000 perform CQI reports after the restarted CQI measurement is complete.

Figure 11:
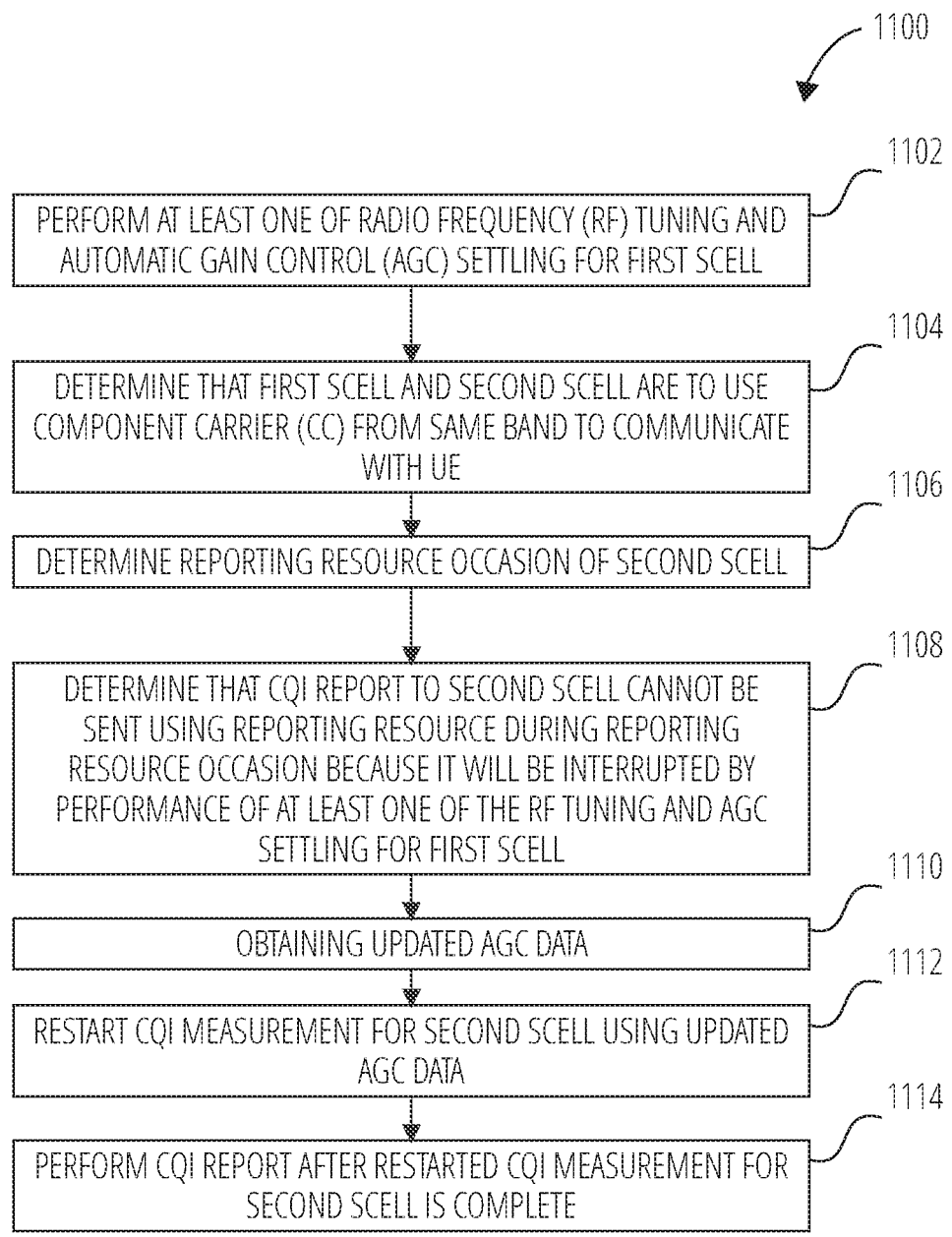
FIG. 11 illustrates a method for SCell activation with interruption from other SCCs, according to an embodiment.

FIG. 11 illustrates a method 1100 for SCell activation with interruption from other SCCs, according to an embodiment. In block 1102, method 1100 performs at least one of Radio Frequency (RF) tuning and Automatic Gain Control (AGC) settling for a first SCell. In block 1104, method 1100 determines that the first SCell and a second SCell are to use a component carrier (CC) from a same band to communicate with the UE. In block 1106, method 1100 determines a reporting resource occasion of the second SCell. In block 1108, method 1100 determines that a CQI report to the second SCell cannot be sent using a reporting resource during the reporting resource occasion because it will be interrupted by the performance of the at least one of the RF tuning and AGC settling for the first SCell. In block 1110, method 1100 obtaining updated AGC data. In block 1112, method 1100 restarts a CQI measurement using the updated AGC data. In block 1114, method 1100 perform CQI reports after the restarted CQI measurement is complete.

Figure 12:
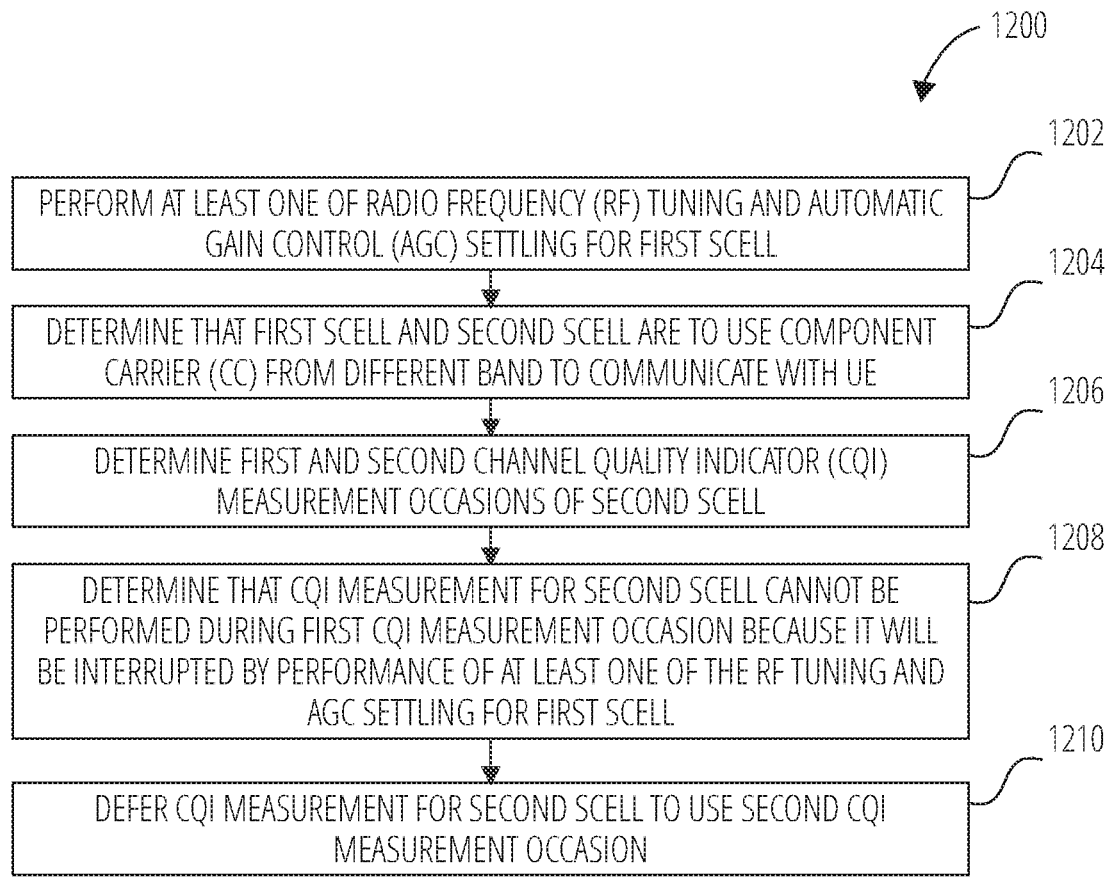
FIG. 12 illustrates a method for SCell activation with interruption from other SCCs, according to an embodiment.

FIG. 12 illustrates a method 1200 for SCell activation with interruption from other SCCs, according to an embodiment. In block 1202, method 1200 performs at least one of Radio Frequency (RF) tuning and Automatic Gain Control (AGC) settling for a first SCell. In block 1204, method 1200 determines that the first SCell and a second SCell are to use a component carrier (CC) from a different band to communicate with the UE. In block 1206, method 1200 determines first and second Channel Quality Indicator (CQI) measurement occasions of the second SCell. In block 1208, method 1200 determines that a CQI measurement for the second SCell cannot be performed during the first CQI measurement occasion because it will be interrupted by the performance of the at least one of the RF tuning and AGC settling for the first SCell. In block 1210, method 1200 defers the CQI measurement for the second SCell to use the second CQI measurement occasion.

Figure 13:
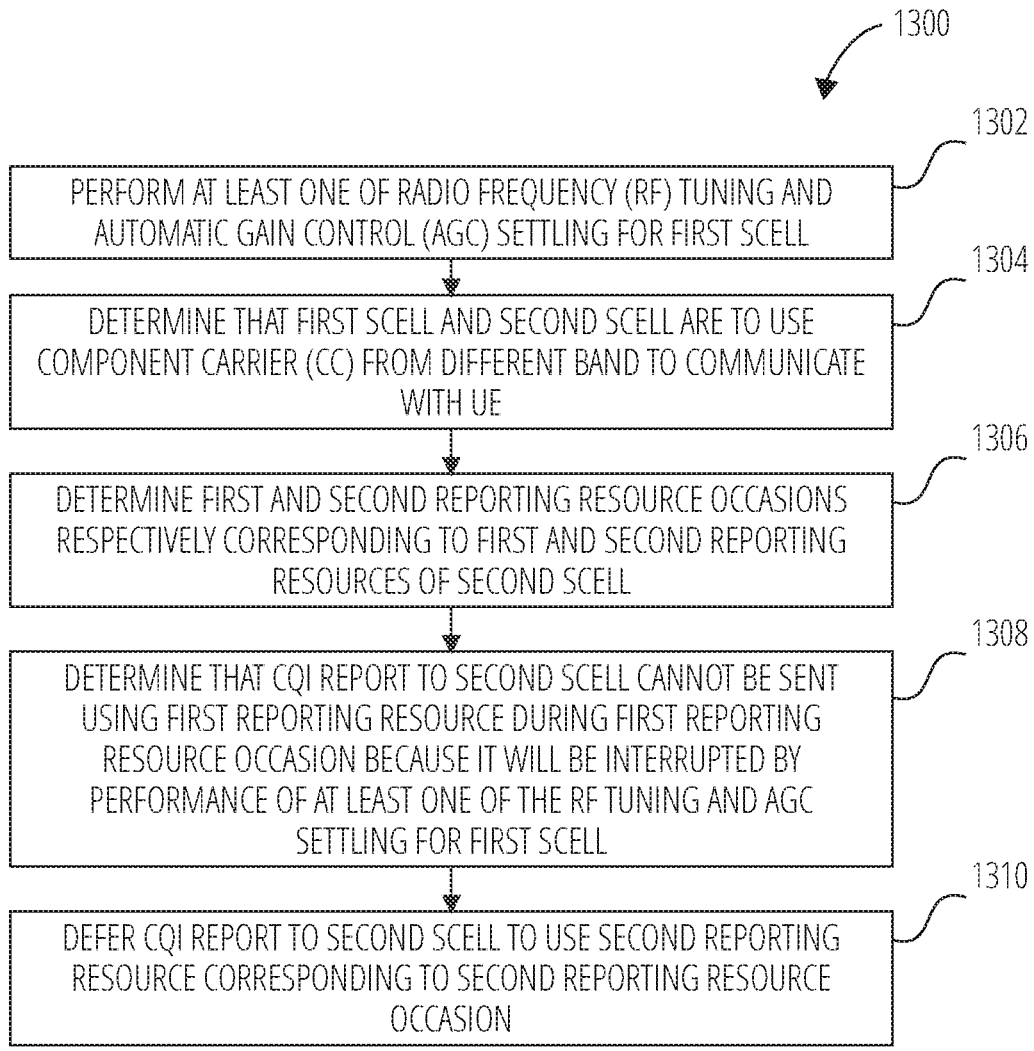
FIG. 13 illustrates a method for SCell activation with interruption from other SCCs, according to an embodiment.

FIG. 13 illustrates a method 1300 for SCell activation with interruption from other SCCs, according to an embodiment. In block 1302, method 1300 performs at least one of Radio Frequency (RF) tuning and Automatic Gain Control (AGC) settling for a first SCell. In block 1304, method 1300 determines that the first SCell and a second SCell are to use a component carrier (CC) from a different band to communicate with the UE. In block 1306, method 1300 determines first and second reporting resource occasions respectively corresponding to first and second reporting resources of the second SCell. In block 1308, method 1300 determines that a CQI report to the second SCell cannot be sent using the first reporting resource during the first reporting resource occasion because it will be interrupted by the performance of the at least one of the RF tuning and AGC settling for the first SCell. In block 1310, method 1300 defers the CQI report to the second SCell to use the second reporting resource corresponding to the second reporting resource occasion.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 14:
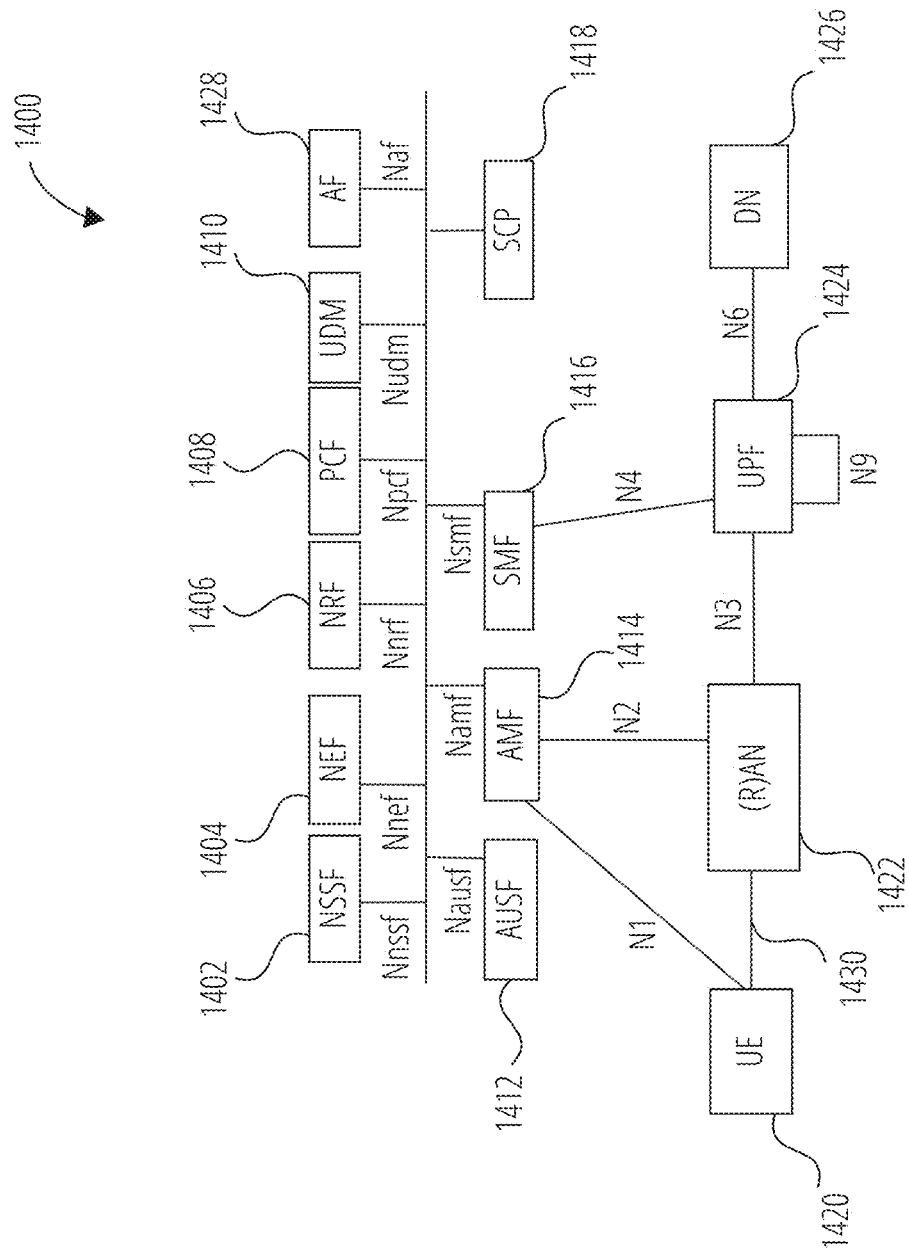
FIG. 14 illustrates an example service based architecture in accordance with certain embodiments.

FIG. 14 illustrates a service based architecture 1400 in 5GS according to one embodiment. As described in 3GPP TS 23.501, the service based architecture 1400 comprises NFs such as an NSSF 1402, a NEF 1404, an NRF 1406, a PCF 1408, a UDM 1410, an AUSF 1412, an AMF 1414, an SMF 1416, for communication with a UE 1420, a (R)AN 1422, a UPF 1424, and a DN 1426. The NFs and NF services can communicate directly, referred to as Direct Communication, or indirectly via a SCP 1418, referred to as Indirect Communication. FIG. 14 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 14 are described below.

The NSSF 1402 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1404 supports exposure of capabilities and events. NF capabilities and events may be securely exposed by the NEF 1404 (e.g., for 3rd party, Application Functions, and/or Edge Computing). The NEF 1404 may store/retrieve information as structured data using a standardized interface (Nudr) to a UDR. The NEF 1404 may also secure provision of information from an external application to 3GPP network and may provide for the Application Functions to securely provide information to the 3GPP network (e.g., expected UE behavior, 5GLAN group information, and service specific information), wherein the NEF 1404 may authenticate and authorize and assist in throttling the Application Functions. The NEF 1404 may provide translation of internal-external information by translating between information exchanged with the AF and information exchanged with the internal network function. For example, the NEF 1404 translates between an AF-Service-Identifier and internal 5G Core information such as DNN and S-NSSAI. The NEF 1404 may handle masking of network and user sensitive information to external AF's according to the network policy. The NEF 1404 may receive information from other network functions (based on exposed capabilities of other network functions), and stores the received information as structured data using a standardized interface to a UDR The stored information can be accessed and re-exposed by the NEF 1404 to other network functions and Application Functions, and used for other purposes such as analytics. For external exposure of services related to specific UE(s), the NEF 1404 may reside in the HPLMN. Depending on operator agreements, the NEF 1404 in the HPLMN may have interface(s) with NF(s) in the VPLMN. When a UE is capable of switching between EPC and 5GC, an SCEF+NEF may be used for service exposure.

The NRF 1406 supports service discovery function by receiving an NF Discovery Request from an NF instance or SCP and providing the information of the discovered NF instances to the NF instance or SCP. The NRF 1406 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1408 supports a unified policy framework to govern network behavior. The PCF 1408 provides policy rules to Control Plane function(s) to enforce them. The PCF 1408 accesses subscription information relevant for policy decisions in a Unified Data Repository (UDR). The PCF 1408 may access the UDR located in the same PLMN as the PCF.

The UDM 1410 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for L1), subscription management, SMS management, 5GLAN group management handling, and/or external parameter provisioning (Expected UE Behavior parameters or Network Configuration parameters). To provide such functionality, the UDM 1410 uses subscription data (including authentication data) that may be stored in a UDR, in which case a UDM implements the application logic and may not require an internal user data storage and several different UDMs may serve the same user in different transactions. The UDM 1410 may be located in the HPLMN of the subscribers it serves, and may access the information of the UDR located in the same PLMN.

The AF 1428 interacts with the Core Network to provide services that, for example, support the following: application influence on traffic routing; accessing the NEF 1404; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 1404 to interact with relevant Network Functions.

The AUSF 1412 supports authentication for 3GPP access and untrusted non-3GPP access. The AUSF 1412 may also provide support for Network Slice-Specific Authentication and Authorization.

The AMF 1414 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1414. Regardless of the number of Network functions, in certain embodiments there is only one NAS interface instance per access network between the UE and the CN, terminated at one of the Network functions that implements at least NAS security and Mobility Management. The AMF 1414 may also include policy related functionalities.

In addition to the functionalities described above, the AMF 1414 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1416 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1416 may include policy related functionalities.

The SCP 1418 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1418 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1420 may include a device with radio communication capabilities. For example, the UE 1420 may comprise a smartphone (e.g., handheld touchscreen mobile computing devices connectable to one or more cellular networks). The UE 1420 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1420 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1420 may be configured to connect or communicatively couple with the (R)AN 1422 through a radio interface 1430, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1420 and the (R)AN 1422 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 1422 to the UE 1420 and a UL transmission may be from the UE 1420 to the (R)AN 1422. The UE 1420 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1422 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1422 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1422) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1420 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1424 may act as an anchor point for intra-RAT and inter-RAT mobility, an external PDU session point of interconnect to the DN 1426, and a branching point to support multi-homed PDU session. The UPF 1424 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1424 may include an uplink classifier to support routing traffic flows to a data network. The DN 1426 may represent various network operator services, Internet access, or third party services. The DN 1426 may include, for example, an application server.

Figure 15:
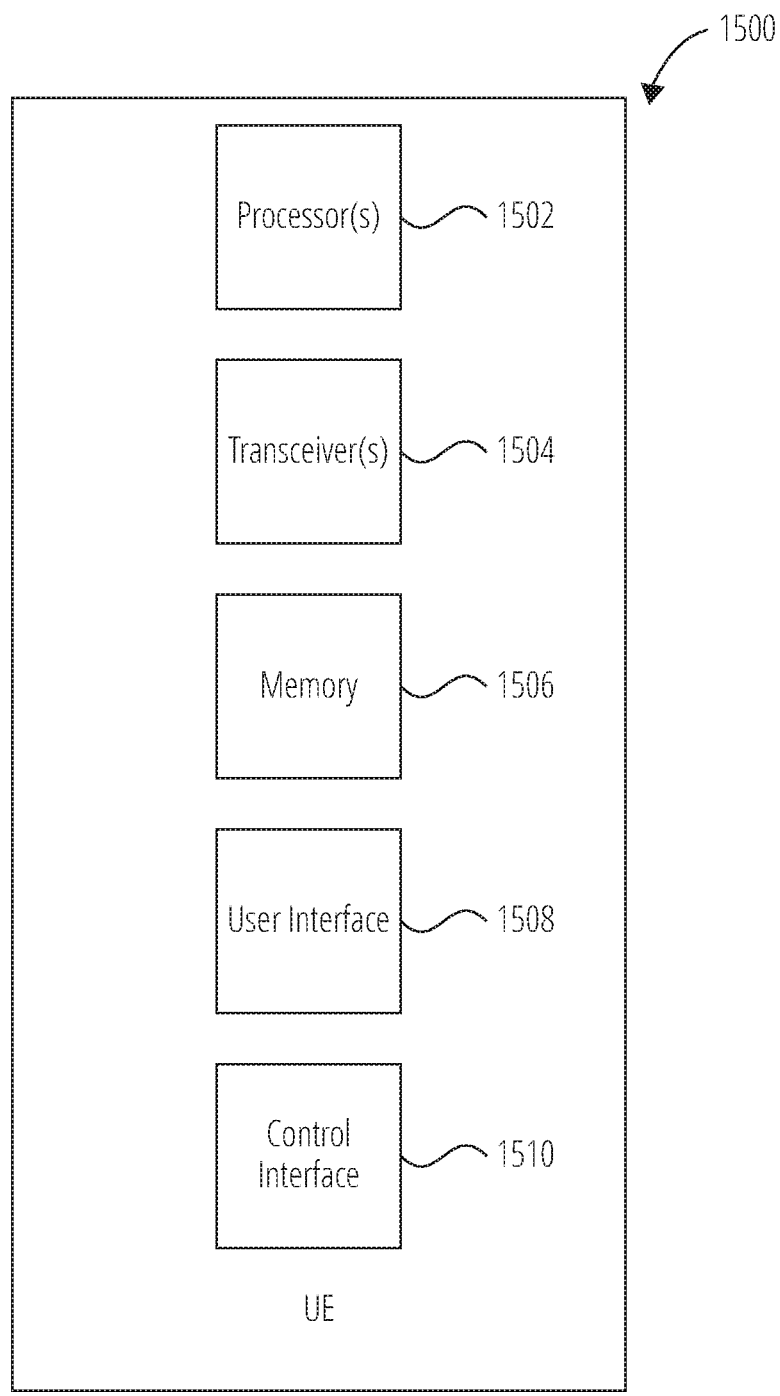
FIG. 15 illustrates a UE in accordance with one embodiment.

FIG. 15 is a block diagram of an example UE 1500 configurable according to various embodiments of the present disclosure, including by execution of instructions on a computer-readable medium that correspond to any of the example methods and/or procedures described herein. The UE 1500 comprises one or more processor 1502, transceiver 1504, memory 1506, user interface 1508, and control interface 1510.

The one or more processor 1502 may include, for example, an application processor, an audio digital signal processor, a central processing unit, and/or one or more baseband processors. Each of the one or more processor 1502 may include internal memory and/or may include interface(s) to communication with external memory (including the memory 1506). The internal or external memory can store software code, programs, and/or instructions for execution by the one or more processor 1502 to configure and/or facilitate the UE 1500 to perform various operations, including operations described herein. For example, execution of the instructions can configure the UE 1500 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1504, user interface 1508, and/or control interface 1510. As another example, the one or more processor 1502 may execute program code stored in the memory 1506 or other memory that corresponds to MAC, RLC, PDCP, and RRC layer protocols standardized by 3GPP (e.g., for NR and/or LTE). As a further example, the processor 1502 may execute program code stored in the memory 1506 or other memory that, together with the one or more transceiver 1504, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1506 may comprise memory area for the one or more processor 1502 to store variables used in protocols, configuration, control, and other functions of the UE 1500, including operations corresponding to, or comprising, any of the example methods and/or procedures described herein. Moreover, the memory 1506 may comprise non-volatile memory (e.g., flash memory), volatile memory (e.g., static or dynamic RAM), or a combination thereof. Furthermore, the memory 1506 may interface with a memory slot by which removable memory cards in one or more formats (e.g., SD Card, Memory Stick, Compact Flash, etc.) can be inserted and removed.

The one or more transceiver 1504 may include radio-frequency transmitter and/or receiver circuitry that facilitates the UE 1500 to communicate with other equipment supporting like wireless communication standards and/or protocols. For example, the one or more transceiver 1504 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1502. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1504 includes a transmitter and a receiver that enable the UE 1500 to communicate with various 5G/NR networks according to various protocols and/or methods proposed for standardization by 3 GPP and/or other standards bodies. For example, such functionality can operate cooperatively with the one or more processor 1502 to implement a PHY layer based on OFDM, OFDMA, and/or SC-FDMA technologies, such as described herein with respect to other figures.

The user interface 1508 may take various forms depending on particular embodiments, or can be absent from the UE 1500. In some embodiments, the user interface 1508 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE

1500 may comprise a tablet computing device including a larger touchscreen display. In such embodiments, one or more of the mechanical features of the user interface 1508 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1500 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1500 having a touch screen display are capable of receiving user inputs, such as inputs related to exemplary methods and/or procedures described herein or otherwise known to persons of ordinary skill in the art.

In some exemplary embodiments of the present disclosure, the UE 1500 may include an orientation sensor, which can be used in various ways by features and functions of the UE 1500. For example, the UE 1500 can use outputs of the orientation sensor to determine when a user has changed the physical orientation of the UE 1500's touch screen display. An indication signal from the orientation sensor can be available to any application program executing on the UE 1500, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1510 may take various forms depending on particular embodiments. For example, the control interface 1510 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1510 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1500 may include more functionality than is shown in FIG. 15 including, for example, a video and/or still-image camera, microphone, media player and/or recorder, etc. Moreover, the one or more transceiver 1504 may include circuitry for communication using additional radio-frequency communication standards including Bluetooth, GPS, and/or others. Moreover, the one or more processor 1502 may execute software code stored in the memory 1506 to control such additional functionality. For example, directional velocity and/or position estimates output from a GPS receiver can be available to any application program executing on the UE 1500, including various exemplary methods and/or computer-readable media according to various exemplary embodiments of the present disclosure.

Figure 16:
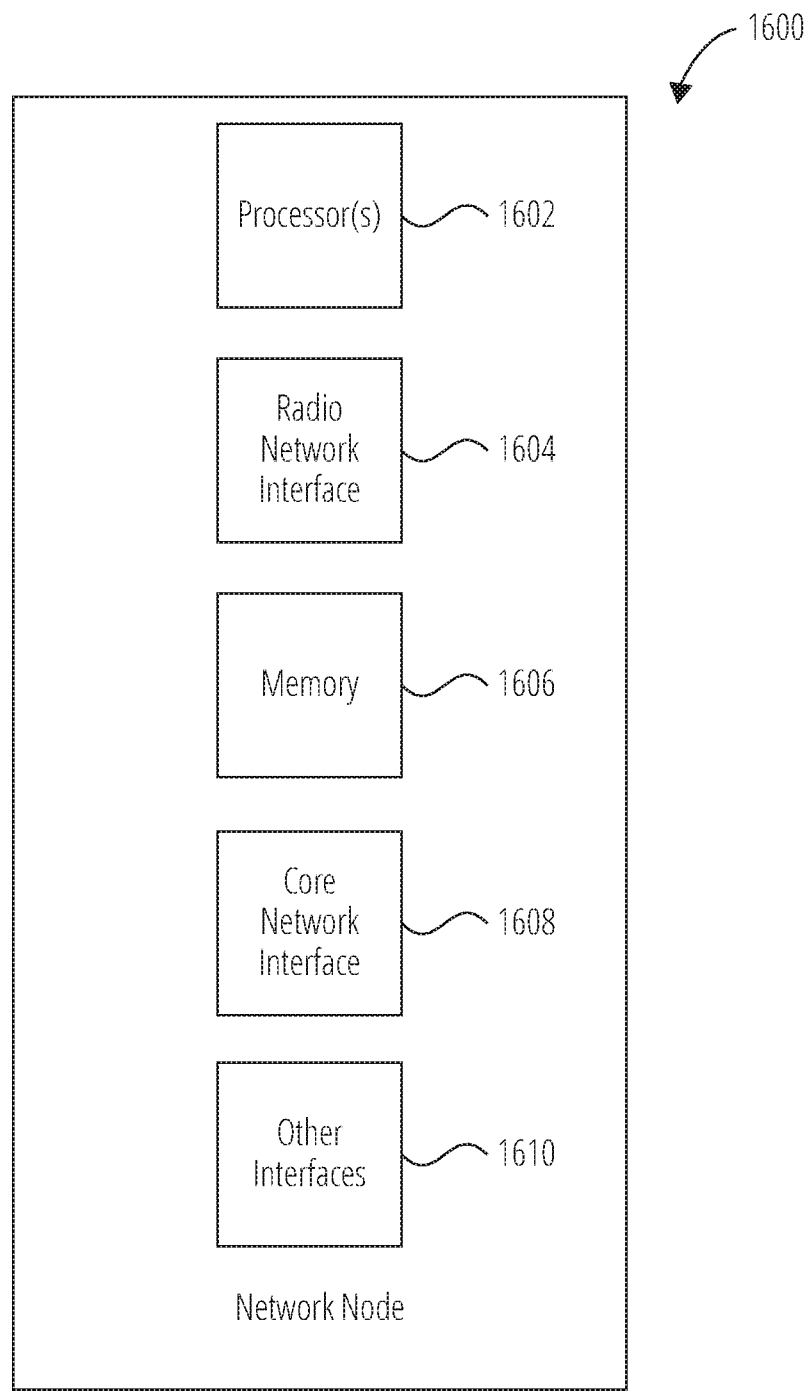
FIG. 16 illustrates a network node in accordance with one embodiment.

FIG. 16 is a block diagram of an example network node 1600 configurable according to various embodiments of the present disclosure, including by execution of instructions on a computer-readable medium that correspond to any of the example methods and/or procedures described herein.

The network node 1600 includes a one or more processor 1602, a radio network interface 1604, a memory 1606, a core network interface 1608, and other interfaces 1610. The network node 1600 may comprise, for example, a base station, eNB, gNB, access node, or component thereof.

The one or more processor 1602 may include any type of processor or processing circuitry and may be configured to perform any of the methods or procedures disclosed herein. The memory 1606 may store software code, programs, and/or instructions executed by the one or more processor 1602 to configure the network node 1600 to perform various operations, including operations described herein. For example, execution of such stored instructions can configure the network node 1600 to communicate with one or more other devices using protocols according to various embodiments of the present disclosure, including one or more methods and/or procedures discussed above. Furthermore, execution of such stored instructions can also configure and/or facilitate the network node 1600 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1604 and the core network interface 1608. By way of example and without limitation, the core network interface 1608 comprise an SI interface and the radio network interface 1604 may comprise a Uu interface, as standardized by 3GPP. The memory 1606 may also store variables used in protocols, configuration, control, and other functions of the network node 1600. As such, the memory 1606 may comprise non-volatile memory (e.g., flash memory, hard disk, etc.), volatile memory (e.g., static or dynamic RAM), network-based (e.g., "cloud") storage, or a combination thereof.

The radio network interface 1604 may include transmitters, receivers, signal processors, ASICs, antennas, beamforming units, and other circuitry that enables network node 1600 to communicate with other equipment such as, in some embodiments, a plurality of compatible user equipment (UE). In some embodiments, the network node 1600 may include various protocols or protocol layers, such as the PHY, MAC, RLC, PDCP, and RRC layer protocols standardized by 3GPP for LTE, LTE-A, and/or 5G/NR According to further embodiments of the present disclosure, the radio network interface 1604 may include a PHY layer based on OFDM, OFDMA, and/or SC-FDMA technologies. In some embodiments, the functionality of such a PHY layer can be provided cooperatively by the radio network interface 1604 and the one or more processor 1602.

The core network interface 1608 may include transmitters, receivers, and other circuitry that enables the network node 1600 to communicate with other equipment in a core network such as, in some embodiments, circuit-switched (CS) and/or packet-switched Core (PS) networks. In some embodiments, the core network interface 1608 may include the S1 interface standardized by 3GPP. In some embodiments, the core network interface 1608 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1608 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1610 may include transmitters, receivers, and other circuitry that enables the network node 1600 to communicate with external networks, computers, databases, and the like for purposes of operations, administration, and maintenance of the network node 1600 or other network equipment operably connected thereto.

EXAMPLES

For one or more embodiments, at least one of the components set forth in one or more of the preceding figures may be configured to perform one or more operations, techniques, processes, and/or methods as set forth in the examples below. For example, baseband circuitry or other processors or processing circuitry as described herein may be configured to operate in accordance with one or more of the examples set forth below. For another example, circuitry associated with a UE, base station, network element, etc. as described above in connection with one or more of the preceding figures may be configured to operate in accordance with one or more of the examples set forth in the examples below.

Example 1 may include an apparatus comprising means to perform one or more elements of a method described herein.

Example 2 may include one or more non-transitory computer-readable media comprising instructions to cause an electronic device, upon execution of the instructions by one or more processors of the electronic device, to perform one or more elements of a method or process described herein.

Example 3 may include an apparatus comprising logic, modules, or circuitry to perform one or more elements of a method or process described herein.

Example 4 may include a method, technique, or process as described in or related to any of examples 1-3, or portions or parts thereof.

Example 5 may include an apparatus comprising: one or more processors and one or more computer-readable media comprising instructions that, when executed by the one or more processors, cause the one or more processors to perform the method, techniques, or process as described in or related to any embodiments herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE), comprising:
    performing at least one of Radio Frequency (RF) tuning and Automatic Gain Control (AGC) settling for a first SCell;
    determining that the first SCell and a second SCell are to use a component carrier (CC) from a same band to communicate with the UE;
    determining a Channel Quality Indicator (CQI) measurement occasion of the second SCell;
    determining that a first CQI measurement for the second SCell cannot be performed using the CQI measurement occasion because it will be interrupted by the performance of the at least one of the RF tuning and AGC settling for the first SCell;
    obtaining updated AGC data;
    performing a second CQI measurement for the second SCell using the updated AGC data; and
    perform CQI reporting after the second CQI measurement for the second SCell is complete.

2. An apparatus of a user equipment (UE), comprising:
    one or more processors; and
    a memory storing instructions that, when executed by the one or more processors, configure the UE to:
        perform at least one of Radio Frequency (RF) tuning and Automatic Gain Control (AGC) settling for a first SCell;
        determine that the first SCell and a second SCell are to use a component carrier (CC) from a same band to communicate with the UE;
        determine a Channel Quality Indicator (CQI) measurement occasion of the second SCell;
        determine that a first CQI measurement for the second SCell cannot be performed using the CQI measurement occasion because it will be interrupted by the performance of the at least one of the RF tuning and AGC settling for the first SCell;
        obtain updated AGC data;
        perform a second CQI measurement for the second SCell using the updated AGC data; and
        perform CQI reporting after the second CQI measurement for the second SCell is complete.

3. A non-transitory computer-readable storage medium including instructions that, when executed by one or more processors of a user equipment (UE), cause the UE to:

perform at least one of Radio Frequency (RF) tuning and Automatic Gain Control (AGC) settling for a first SCell;

determine that the first SCell and a second SCell are to use a component carrier (CC) from a same band to communicate with the UE;

determine a Channel Quality Indicator (CQI) measurement occasion of the second SCell;

determine that a first CQI measurement for the second SCell cannot be performed using the CQI measurement occasion because it will be interrupted by the performance of the at least one of the RF tuning and AGC settling for the first SCell;

obtain updated AGC data;

perform a second CQI measurement for the second SCell using the updated AGC data; and perform CQI reporting after the second CQI measurement for the second SCell is complete.

* * * * *